(12) United States Patent
An et al.

(10) Patent No.: US 11,210,555 B2
(45) Date of Patent: Dec. 28, 2021

(54) HIGH-DIMENSIONAL IMAGE FEATURE MATCHING METHOD AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Shan An, Beijing (CN); Yu Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 143 days.

(21) Appl. No.: 16/494,632

(22) PCT Filed: Dec. 28, 2017

(86) PCT No.: PCT/CN2017/119489
§ 371 (c)(1),
(2) Date: Sep. 16, 2019

(87) PCT Pub. No.: WO2018/166273
PCT Pub. Date: Sep. 20, 2018

(65) Prior Publication Data
US 2020/0026958 A1     Jan. 23, 2020

(30) Foreign Application Priority Data
Mar. 17, 2017     (CN) .......................... 201710158472.3

(51) Int. Cl.
G06K 9/62     (2006.01)
G06F 16/583     (2019.01)
G06F 16/51     (2019.01)

(52) U.S. Cl.
CPC ............ *G06K 9/6223* (2013.01); *G06F 16/51* (2019.01); *G06F 16/583* (2019.01); *G06K 9/6215* (2013.01); *G06K 9/6228* (2013.01)

(58) Field of Classification Search
None
See application file for complete search history.

(56) References Cited

U.S. PATENT DOCUMENTS 8,295,575 B2      10/2012    Feldman et al.
2010/0329529 A1   12/2010    Feldman et al.

FOREIGN PATENT DOCUMENTS

CN     101038622 A     9/2007
CN     101211355 A     7/2008
(Continued)

OTHER PUBLICATIONS

Machine translation of CN 101211355 B, accessed Apr. 29, 2021 (Year: 2021).*

(Continued)

*Primary Examiner* — Edward Park
(74) *Attorney, Agent, or Firm* — Oblon, McClelland, Maier & Neustadt, L.L.P.

(57) ABSTRACT

A high-dimensional image feature matching method and device relating to the field of image retrieval. The method includes extracting a high-dimensional image feature of an image to be retrieved; dividing the high-dimensional image feature of the image to be retrieved into a plurality of low-dimensional image features; comparing each of the low-dimensional image features of the image to be retrieved with clustering centers at each layer of the low-dimensional image features of the images in a database; and determining a similarity the low-dimensional image feature between the image to be retrieved and each of some images in the database according to a comparison result, so that at least (Continued)

one feature matching the high-dimensional image feature of the image to be retrieved is retrieved in the database.

12 Claims, 6 Drawing Sheets

(56) References Cited

FOREIGN PATENT DOCUMENTS

| | | | | |
|---|---|---|---|---|
| CN | 101211355 | B | * | 5/2010 |
| CN | 101989326 | A | | 3/2011 |
| CN | 102004917 | A | | 4/2011 |
| CN | 102073748 | A | | 5/2011 |
| CN | 102123172 | A | | 7/2011 |
| CN | 102760128 | A | | 10/2012 |
| CN | 103034963 | A | | 4/2013 |
| CN | 104008174 | A | | 8/2014 |
| CN | 104239859 | A | | 12/2014 |
| CN | 104699781 | A | | 6/2015 |
| CN | 104765764 | A | | 7/2015 |
| CN | 104778284 | A | | 7/2015 |
| CN | 105912611 | A | | 8/2016 |
| CN | 106326288 | A | | 1/2017 |
| CN | 104008174 | B | * | 6/2017 |
| JP | 2008-102856 | A | | 5/2005 |
| JP | 2013-246550 | A | | 12/2013 |
| WO | WO 2009/058915 | A1 | | 5/2009 |
| WO | 2017/012491 | A1 | | 1/2017 |

OTHER PUBLICATIONS

Machine translation of CN 104008174 B, accessed Apr. 29, 2021 (Year: 2021).*

Combined Chinese Office Action and Search Report dated Jan. 21, 2021 in Patent Application No. 201710158472.3 (with English language translation), 22 pages.

Combined Chinese Office Action and Search Report dated Jul. 29, 2020 in corresponding Chinese Patent Application No. 201710158472.3 (with English Translation and English Translation of Category of Cited Documents), 21 pages.

Dr. K. Sakthivel et al., "Region Based Image Retrieval using k-means and Hierarchical Clustering Algorithms", International Journal of Innovative Research in Science, Engineering and Technology, vol. 3, Special Issue 1, Feb. 2014, pp. 1255-1260.

Combined Chinese Office Action and Search Report dated Jan. 6, 2020 in corresponding Chinese Patent Application No. 201710158472.3 (with English Translation and English Translation of Category of Cited Documents), 17 pages.

International Search Report dated Mar. 23, 2018 in PCT/CN2017/119489, 8 pages (with English translation).

International Preliminary Report on Patentability dated Sep. 17, 2019 in PCT/CN2017/119489, 9 pages (with English translation).

Examination report dated Sep. 10, 2021 in corresponding Indian Patent Application No. 201937039152 (with English)(7 pages).

* cited by examiner

HIGH-DIMENSIONAL IMAGE FEATURE MATCHING METHOD AND DEVICE

CROSS-REFERENCE TO RELATED APPLICATIONS

The present application is based on and claims priority to Chinese Patent Application No. 201710158472.3 filed on Mar. 17, 2017, the disclosure of which is incorporated hereby as a whole into the present disclosure.

TECHNICAL FIELD

The present disclosure relates to the field of image retrieval, and in particular, to a high-dimensional image feature matching method and device.

BACKGROUND

The feature matching problem is normally defined as an Approximate Nearest Neighbor searching problem, i.e. searching a feature in database features, the Euclidean distance of which is closest to the retrieved feature. The high-dimensional feature refers to an image feature exceeding 1000 dimensions, and it is very difficult to matching a high-dimensional image due to the presence of Curse of dimensionality.

The description method of an image consists in two categories including a local feature and a global feature. The local feature of an image usually consists in some hundred features having a low dimension, and the global feature of an image usually consists in a single feature having a high dimension. Currently, the global feature may be matched by exhaustive search, which can ensure an exact match of the nearest neighbor at an Euclidean distance. Feature matching may also be performed by learning binary codes, and this method converts a high-dimensional feature into binary codes having low dimensions but retaining similarities by using bilinear mapping.

SUMMARY

According to some embodiments of the present disclosure, a high-dimensional image feature matching method is provided. The method therein comprises: extracting a high-dimensional image feature of an image to be retrieved; dividing the high-dimensional image feature of the image to be retrieved into a plurality of low-dimensional image features; determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database.

In some embodiments, the clustering centers at each layer of the low-dimensional image features of the images in the database are determined by the following methods: extracting a high-dimensional image feature of each of the images in the database; dividing the high-dimensional image feature of each of the images in the database into a plurality of low-dimensional image features; and determining the clustering centers at each layer of the low-dimensional image features by performing layered clustering calculation on the low-dimensional image features of the images in the database.

In some embodiments, each of the clustering centers at each layer of the low-dimensional image features of the images in the database is associated with an inverted file.

In some embodiments, determining the clustering centers at each layer of the low-dimensional image features by performing layered clustering calculation on the low-dimensional image features of the images in the database comprises: performing unsupervised training on a set consisting of low-dimensional image features of the images in the database, wherein a bifurcating factor of a clustering is defined to be k; randomly selecting one low-dimensional image feature data point in an initial training set as an initial clustering center of a kmeans clustering algorithm; determining k initial clustering centers according to probability ratios of low-dimensional image feature data points to nearest centers; dividing a set consisting of the low-dimensional image features of the images in the database into k sets using the kmeans clustering algorithm, and making the k sets as sets of a first layer of a kmeans tree; sequentially performing iterative division of each set of a current layer in the kmeans tree using the kmeans clustering algorithm until a leaf layer of the kmeans tree is reached; calculating a clustering center of each set of each layer of the low-dimensional image features of the images in the database according to a clustering mean.

In some embodiments, comparing each of the low-dimensional image features of the image to be retrieved with the clustering centers at each layer of the low-dimensional image features of the images in a database comprises: comparing each of the low-dimensional image features of the image to be retrieved with each of k clustering centers of a first layer of the kmeans tree of the low-dimensional image features of the images in the database, to determine a nearest clustering center corresponding to each of the low-dimensional image features of the image to be retrieved at the first layer, wherein the determined nearest clustering center is nearest to the corresponding low-dimensional image feature; and comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of the previous layer.

In some embodiments, determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database comprises: determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center; determining a similarity score of the low-dimensional image feature between the image to be retrieved and each of the images associated with the determined nearest clustering center in the database, according to the distance between the feature vector of each of the images associated with the determined nearest clustering center in the database and the feature vector of the image to be retrieved; and obtaining N images with the highest score in the database using a quick select algorithm combined with an insertion sort algorithm, and making the high-dimensional image features of the N images with the highest score as features matching the high-dimensional image feature of the image to be retrieved.

According to other embodiments of the present disclosure, a high-dimensional image feature matching device is further proposed. The device comprises: a memory; and a processor coupled to the memory, wherein the processor is configured to perform a high-dimensional image feature method based on the instructions stored in the memory, comprising: extracting a high-dimensional image feature of an image to be retrieved; dividing the high-dimensional image feature of the image to be retrieved into a plurality of low-dimensional image features; determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database.

In some embodiments, the clustering centers at each layer of the low-dimensional image features of the images in the database are determined by the following methods: extracting a high-dimensional image feature of each of the images in the database; dividing the high-dimensional image feature of each of the images in the database into a plurality of low-dimensional image features; and determining the clustering centers at each layer of the low-dimensional image features by performing layered clustering calculation on the low-dimensional image features of the images in the database.

In some embodiments, each of the clustering centers at each layer of the low-dimensional image features of the images in the database is associated with an inverted file.

In some embodiments, determining the clustering centers at each layer of the low-dimensional image features by performing layered clustering calculation on the low-dimensional image features of the images in the database comprises: performing unsupervised training on a set consisting of low-dimensional image features of the images in the database, wherein a bifurcating factor of a clustering is defined to be k; randomly selecting one low-dimensional image feature data point in an initial training set as an initial clustering center of a kmeans clustering algorithm; determining k initial clustering centers according to probability ratios of low-dimensional image feature data points to nearest centers; dividing a set consisting of the low-dimensional image features of the images in the database into k sets using the kmeans clustering algorithm, and making the k sets as sets of a first layer of a kmeans tree; sequentially performing iterative division of each set of a current layer in the kmeans tree using the kmeans clustering algorithm until a leaf layer of the kmeans tree is reached; calculating a clustering center of each set of each layer of the low-dimensional image features of the images in the database according to a clustering mean.

In some embodiments, comparing each of the low-dimensional image features of the image to be retrieved with the clustering centers at each layer of the low-dimensional image features of the images in a database comprises: comparing each of the low-dimensional image features of the image to be retrieved with each of k clustering centers a first layer of the kmeans tree of the low-dimensional image features of the images in the database, to determine a nearest clustering center corresponding to each of the low-dimensional image features of the image to be retrieved at the first layer, wherein the determined nearest clustering center is nearest to the corresponding low-dimensional image feature; and comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of the previous layer.

In some embodiments, determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database comprises: determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center; determining a similarity score of the low-dimensional image feature between the image to be retrieved and each of the images associated with the determined nearest clustering center in the database, according to the distance between the feature vector of each of the images associated with the determined nearest clustering center in the database and the feature vector of the image to be retrieved; and obtaining N images with the highest score in the database using a quick select algorithm combined with an insertion sort algorithm, and making the high-dimensional image features of the N images with the highest score as features matching the high-dimensional image feature of the image to be retrieved.

According to other embodiments of the present disclosure, a computer readable storage medium is further proposed. The computer readable storage medium has stored thereon computer program instructions which, when executed by a processor, implement a high-dimensional image feature method, comprising: extracting a high-dimensional image feature of an image to be retrieved; dividing the high-dimensional image feature of the image to be retrieved into a plurality of low-dimensional image features; determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database.

In some embodiments, the clustering centers at each layer of the low-dimensional image features of the images in the database are determined by the following methods: extracting a high-dimensional image feature of each of the images in the database; dividing the high-dimensional image feature of each of the images in the database into a plurality of low-dimensional image features; and determining the clustering centers at each layer of the low-dimensional image features by performing layered clustering calculation on the low-dimensional image features of the images in the database.

In some embodiments, each of the clustering centers at each layer of the low-dimensional image features of the images in the database is associated with an inverted file.

In some embodiments, determining the clustering centers at each layer of the low-dimensional image features by performing layered clustering calculation on the low-dimensional image features of the images in the database comprises: performing unsupervised training on a set consisting of low-dimensional image features of the images in the database, wherein a bifurcating factor of a clustering is defined to be k; randomly selecting one low-dimensional image feature data point in an initial training set as an initial clustering center of a kmeans clustering algorithm; determining k initial clustering centers according to probability ratios of low-dimensional image feature data points to nearest centers; dividing a set consisting of the low-dimensional image features of the images in the database into k sets using the kmeans clustering algorithm, and making the k sets as sets of a first layer of a kmeans tree; sequentially performing iterative division of each set of a current layer in the kmeans tree using the kmeans clustering algorithm until a leaf layer of the kmeans tree is reached; calculating a clustering center of each set of each layer of the low-dimensional image features of the images in the database according to a clustering mean.

In some embodiments, comparing each of the low-dimensional image features of the image to be retrieved with the clustering centers at each layer of the low-dimensional image features of the images in a database comprises: comparing each of the low-dimensional image features of the image to be retrieved with each of k clustering centers a first layer of the kmeans tree of the low-dimensional image features of the images in the database, to determine a nearest clustering center corresponding to each of the low-dimensional image features of the image to be retrieved at the first layer, wherein the determined nearest clustering center is nearest to the corresponding low-dimensional image feature; and comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of the previous layer.

In some embodiments, determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database comprises: determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center; determining a similarity score of the low-dimensional image feature between the image to be retrieved and each of the images associated with the determined nearest clustering center in the database, according to the distance between the feature vector of each of the images associated with the determined nearest clustering center in the database and the feature vector of the image to be retrieved; and obtaining N images with the highest score in the database using a quick select algorithm combined with an insertion sort algorithm, and making the high-dimensional image features of the N images with the highest score as features matching the high-dimensional image feature of the image to be retrieved.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

DETAILED DESCRIPTION

Figure 1:
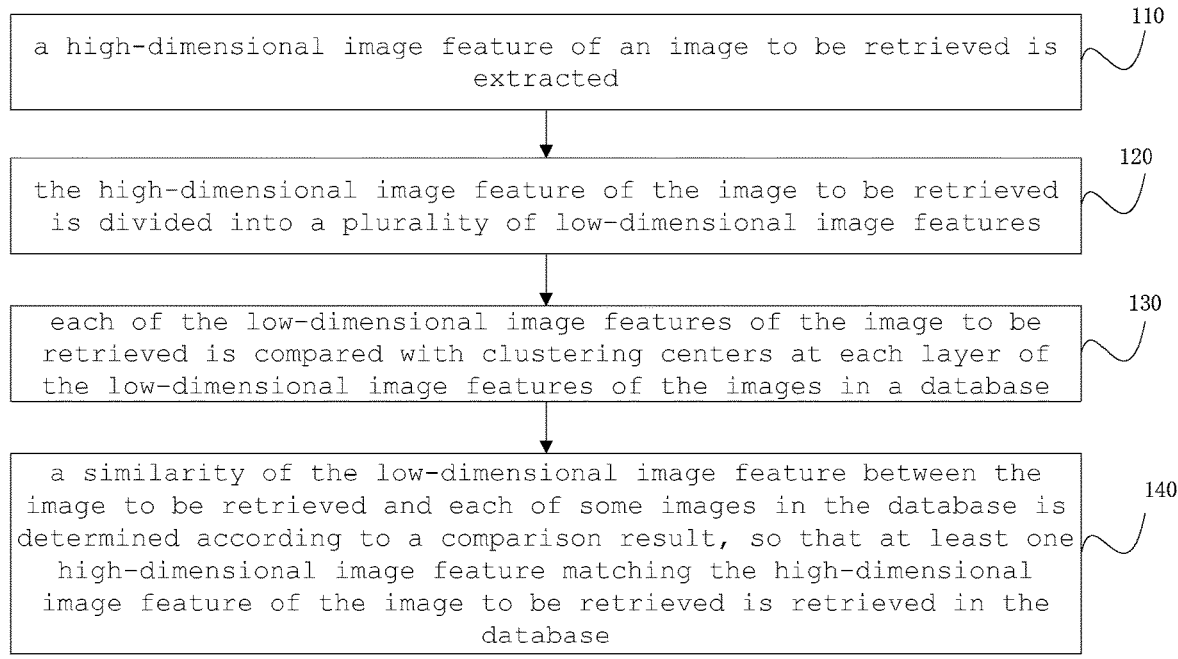
FIG. 1 is a schematic flow chart of some embodiments of a high-dimensional image feature matching method according to the present disclosure.

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, in order to facilitate the description, the dimensions of various parts shown in the drawings are not delineated according to actual proportional relations.

The following descriptions of at least one exemplary embodiment which are in fact merely descriptive, by no means serve as any delimitation on the present disclosure as well as its application or use.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as a delimitation. Thus, other examples of exemplary embodiments may have different values.

It should be noted that similar reference signs and letters present similar items in the following drawings, and therefore, once an item is defined in a drawing, there is no need for further discussion in the subsequent drawings.

In order to make the object, technical solution and advantages of the present disclosure clear and explicit, the present disclosure will be further described in detail in conjunction with the specific embodiments and with reference to the drawings.

FIG. 1 is a schematic flow chart of some embodiments of a high-dimensional image feature matching method according to the present disclosure. The method comprises the following steps 110-140:

In step 110, a high-dimensional image feature of an image to be retrieved is extracted. The high-dimensional feature refers to an image feature exceeding 1000 dimensions, and the high-dimensional image feature of the image to be retrieved may be extracted by using deep neutral network. Each output layer of the deep neural network may obtain a feature reaching 4096 dimensions. The features of the last two output layers may be used for linear combination into an 8192-dimensional feature to describe an image, i.e. an image may be represented by one 8192-dimensional feature.

In step 120, the high-dimensional image feature of the image to be retrieved is divided into a plurality of low-dimensional image features. The high-dimensional image feature $x$ is divided into $m$ different low-dimensional image features $u_j$, $1 \le j \le m$, and the low-dimensional image feature $u_j$ has a dimension of $D^*=D/m$, where D is a multiple of $m$. The dividing formula is as follows:

$$x, \ldots x_{D^*} | \ldots | x_{D-D^*+1}, \ldots x_D \rightarrow u_{1(x)}, \ldots u_{m(x)} \quad (1)$$

In step 130, each of the low-dimensional image features of the image to be retrieved is compared with clustering centers at each layer of the low-dimensional image features of the images in a database, to determine a nearest clustering center at each layer corresponding to each of the low-dimensional image features of the image to be retrieved, wherein the determined nearest clustering center is nearest to the corresponding low-dimensional image feature. A high-dimensional image feature of each of the images in the database is extracted in advance, the high-dimensional image feature of each of the images in the database is divided into a plurality of low-dimensional image features, the clustering centers at each layer of the low-dimensional image features are determined by performing layered clustering calculation on the low-dimensional image features of the images in the database, and finally each of the low-dimensional image features of the image to be retrieved is compared with clustering centers at each layer.

In step 140, a similarity of the low-dimensional image feature between the image to be retrieved and each of some images in the database is determined according to a comparison result, so that at least one high-dimensional image feature matching the high-dimensional image feature of the image to be retrieved is retrieved in the database. For example, similarities of image features are first scored, and the high-dimensional image features of N images with the highest score are made as features matching the high-dimensional image feature of the image to be retrieved.

In this embodiment, the high-dimensional image feature of the image to be retrieved is divided into a plurality of low-dimensional image features; then each of the low-dimensional image features is compared with clustering centers at each layer of the low-dimensional image features of the images in a database; and a similarity of the low-dimensional image feature between the image to be retrieved and each of some images in the database is determined, so that features matching the high-dimensional image feature of the image to be retrieved are retrieved in the database, and the efficiency of high-dimensional image feature matching is improved.

Figure 2:
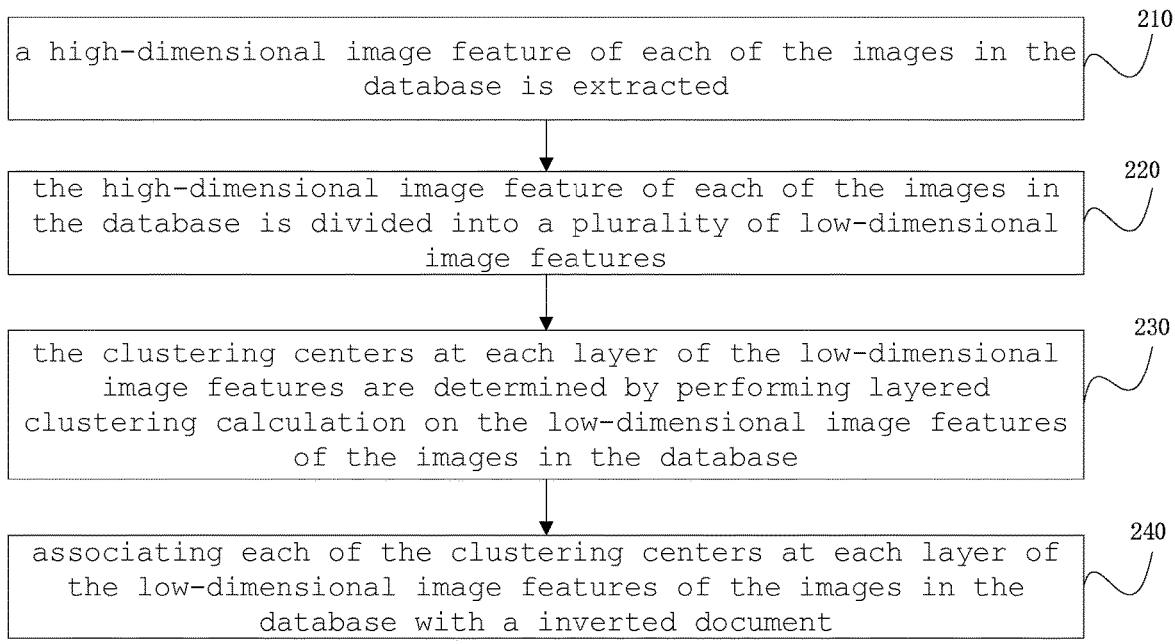
FIG. 2 is a schematic flow chart of some embodiments of an offline training process of a high-dimensional image feature matching method according to the present disclosure.

The high-dimensional image feature matching method of the present disclosure comprises an offline training process and an online retrieval process. FIG. 2 is a schematic flow chart of some embodiments of an offline training process of a high-dimensional image feature matching method according to the present disclosure.

In step 210, a high-dimensional image feature of each of the images in the database is extracted. The high-dimensional image feature of each of the images in the database may be extracted by using deep neutral network.

In step 220, the high-dimensional image feature of each of the images in the database is divided into a plurality of low-dimensional image features. The high-dimensional image features of the images in the database and the image to be retrieved may have the same dividing manner.

In step 230, the clustering centers at each layer of the low-dimensional image features are determined by performing layered clustering calculation on the low-dimensional image features of the images in the database. Unsupervised training on a set consisting of low-dimensional image features of the images in the database may be performed, wherein a bifurcating factor of a clustering is defined to be k which is a natural number. One low-dimensional image feature data point in an initial training set is randomly selected as an initial clustering center of a kmeans clustering algorithm; k initial clustering centers are determined according to probability ratios of points to nearest centers. Then, a set consisting of the low-dimensional image features of the images in the database is divided into k sets using the kmeans clustering algorithm, and the k sets are used as sets of a first layer of a kmeans tree. Then, iterative division of each set of a current layer in the kmeans tree is sequentially performed using the kmeans clustering algorithm until a leaf layer of the kmeans tree is reached, and a clustering center of each set of each layer of the low-dimensional image features of the images in the database is calculated according to a clustering mean.

Figure 3:
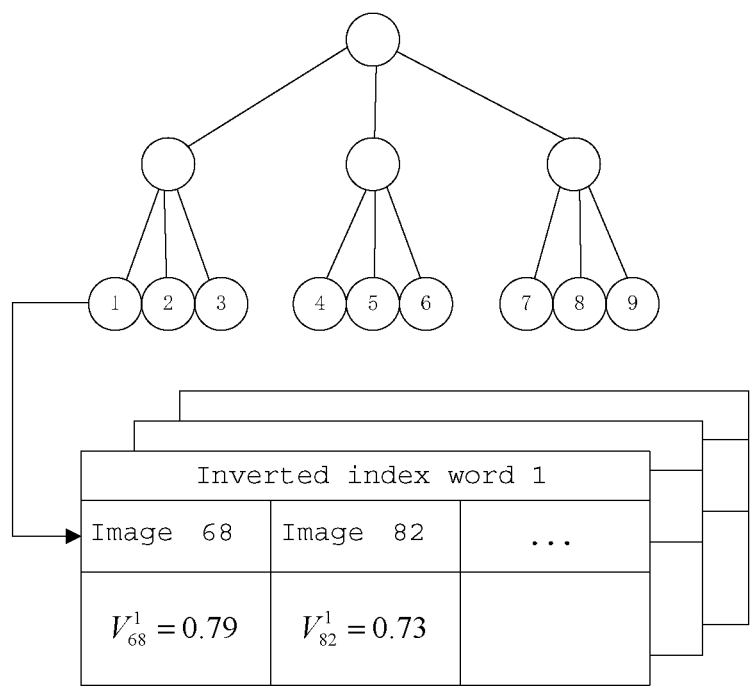
FIG. 3 is a schematic view of an inverted file.

In order to enable quickly finding the clustering centers of the low-dimensional image features during online retrieval, this offline training process may further comprise a step 240, i.e. associating each of the clustering centers at each layer of the low-dimensional image features of the images in the database with an inverted document. Each of the clustering centers may be defined as a visual word, and each visual word is associated with one inverted document, wherein the inverted document makes a statistic of the frequency of visual words appearing in each file. The inverted document is shown in FIG. 3, 1, 2 . . . 9 represent visual words.

In a specific application, each visual word $w_j$ may be measured using the inverse document frequency. The calculation formula of the inverted document frequency is as follows:

$$idf(i) = \log\frac{N}{n_i} \quad (2)$$

wherein idf(i) is a frequency of the inverted document, N is the number of training images, and $n_j$ represents the times of the visual word $w_j$ appearing in the training images.

In order to convert the image $I_t$ in to a bag-of-words vector $v_t \in R^W$, the intermediate node with the shortest L2 distance is selected at each layer, and the image feature vector is traversed from the first layer of the kmeans tree to the leaf layer. The calculation of the term frequency of each word in the image $I_t$ is shown as follows:

$$tf(i, It) = \frac{n_{iIt}}{n_{It}} \quad (3)$$

wherein tf(i,It) is a term frequency of each word in the image $I_t$; $n_{iIt}$ represents the times of the word appearing in the image, $n_{It}$ represents a total of the words in the image.

The i item of the vector $v_t$ is:

$$v_t^i = tf(i,It) \times idf(i) \quad (4)$$

One inverted document is maintained whilst establishing a bag-of-words model, and for each word $w_j$ in the vocabulary, a list of images $I_t$ containing the word is stored, so that it is only necessary to compare images with the same word as the image to be retrieved when the database is retrieved.

Figure 4:
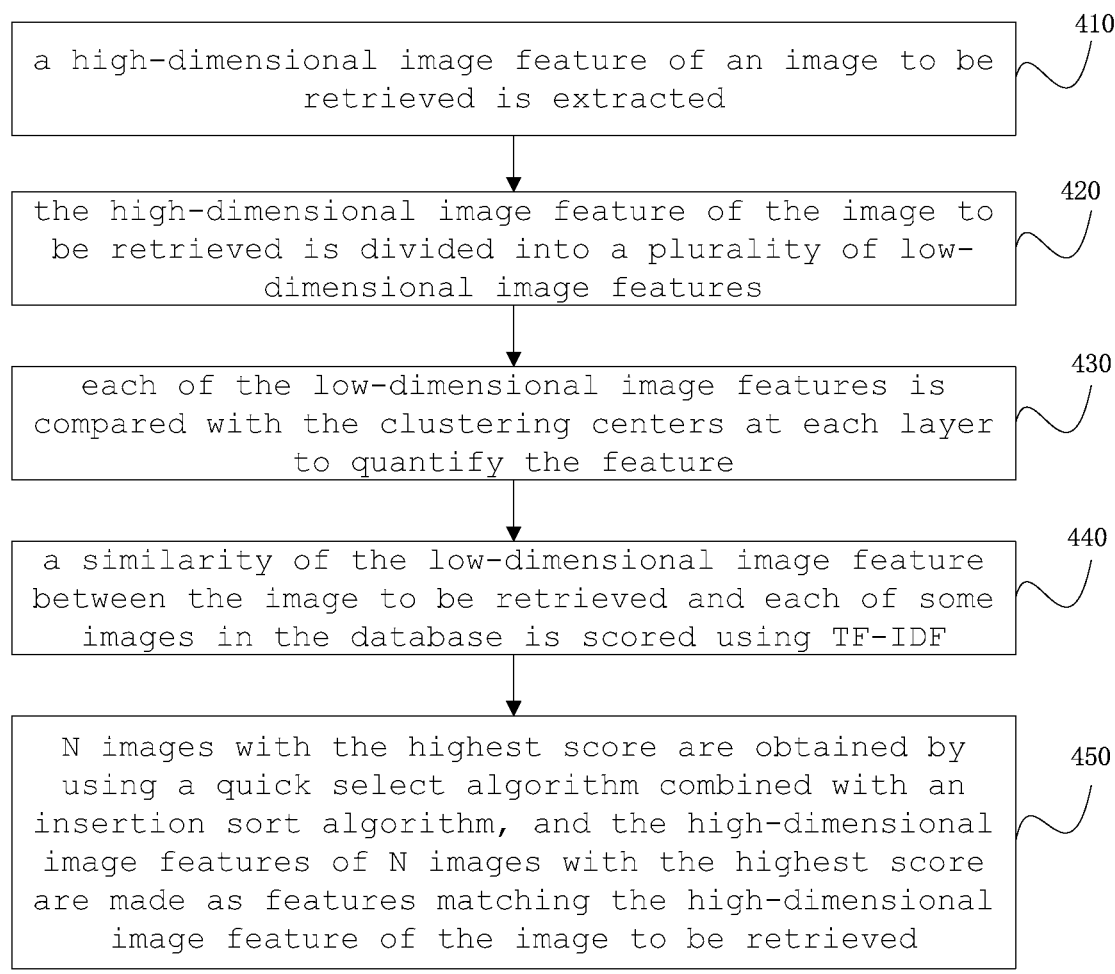
FIG. 4 is a schematic flow chart of some embodiments of an online training process of a high-dimensional image feature matching method according to the present disclosure.

The on-line training process is as shown in FIG. 4. In step 410, a high-dimensional image feature of an image to be retrieved is extracted.

In step 420, the high-dimensional image feature of the image to be retrieved is divided into a plurality of low-dimensional image features.

In step 430, each of the low-dimensional image features is compared with the clustering centers at each layer to quantify the feature. Each of the low-dimensional image features of the image to be retrieved is compared with each of the k clustering centers at each layer, starting from the first layer of the kmeans tree of the low-dimensional image features of the images in the database, to determine a nearest clustering center corresponding to each of the low-dimensional image features of the image to be retrieved, wherein the nearest clustering center is nearest to the corresponding low-dimensional image feature, and each of the low-dimensional image features of the image to be retrieved is compared with each sub-clustering center of each nearest clustering center by recursion, until a leaf layer of the kmeans tree is reached. This process quantifies each of the low-dimensional image features. For example, each of the low-dimensional image features of the image to be retrieved is compared with each of k clustering centers of a first layer of the kmeans tree of the low-dimensional image features of the images in the database, to determine a nearest clustering center corresponding to each of the low-dimensional image features of the image to be retrieved at the first layer, wherein the nearest clustering center is nearest to the corresponding low-dimensional image feature; and each of the low-dimensional image features of the image to be retrieved is compared with each of k clustering centers of the current layer by recursion, starting from a second layer of the kmeans tree, and ending at a leaf layer of the kmeans tree, wherein the k clustering centers of the current layer are sub-clustering centers of the nearest clustering center of the previous layer.

If the kmeans tree contains L layers, for one low-dimensional image feature, the calculation cost required for quantization in total consists in kL times of distance calculation, and when k is not large, the quantization process is very fast.

In step 440, a similarity of the low-dimensional image feature between the image to be retrieved and each of some images in the database is scored using TF-IDF (Term Frequency Inverse Document Frequency). For example, a feature vector of each of the images associated with the determined nearest clustering center in the database and a feature vector of the image to be retrieved are determined, by calculating the low-dimensional image features of the images in the database and the low-dimensional image features of the image to be retrieved, using a term frequency-inverse document frequency algorithm, and according to the determined nearest clustering center; a similarity score of the low-dimensional image feature between the image to be retrieved and each of the images associated with the determined nearest clustering center in the database is determined, according to the distance between the feature vector of each of the images associated with the determined nearest clustering center in the database and the feature vector of the image to be retrieved.

In some embodiments, a weight may be set for each layer of the kmeans tree, and then a corresponding score is added to the low-dimensional image features at the same layer. Since different layers contain different information quantities, the weights are also different. When the two low-dimensional image features are close to the leaf layer, the two features are more similar, and the weight of the layer is also greater, while the weight is less when they are close to the first layer. The weight of layer i is set as follows according to the information entropy:

$$w_i = \frac{\ln N}{N_1} \quad (5)$$

wherein N is the number of images in the database, $N_i$ is the number of images in the database having at least one low-dimensional image feature passing through the layer i, i.e. belonging to the same cluster with the nearest clustering center which is nearest to the corresponding low-dimensional image feature of the image to be retrieved at layer i. The vector to be retrieved and the database vector are defined according to the above-described weight:

$$d_i = m_i \times w_i \quad (6)$$

$$q_i = n_i \times w_i \quad (7)$$

Wherein $m_i$ and $n_i$ are respectively the number of the low-dimensional image features in the image to be retrieved and the images in the database that pass through layer i, i.e. belong to the same cluster with the nearest clustering center which is nearest to the corresponding low-dimensional image feature of the image to be retrieved at layer i. $d_i$ is a quantitative feature value of the image to be retrieved at layer i, $q_i$ is a quantitative feature value of each of the images associated with the determined nearest clustering center in the database at layer i, $d=[d_1, d_2 \ldots d_i \ldots, d_L]$, $q=[q_1, q_2, \ldots q_i \ldots q_L]$, wherein d is a feature vector of the image to be retrieved, q is a feature vector of each of the images associated with the determined nearest clustering center in the database. The similarity between the features of two images is scored as follows:

$$s(q,d) = \left\| \frac{q}{\|q\|} - \frac{d}{\|d\|} \right\| = \|q - d\| \quad (8)$$

L1 norm may be used for calculation:

$$\|q - d\| = 1 - \frac{1}{2}\left| \frac{q}{|q|} - \frac{d}{|d|} \right| \quad (9)$$

In step 450, N images with the highest score are obtained by using a quick select algorithm combined with an insertion sort algorithm, and the high-dimensional image features of N images with the highest score are made as features matching the high-dimensional image feature of the image to be retrieved.

After the scoring of the similarity between the image to be retrieved and each of some images in the database are obtained by calculation, it is necessary to obtain the images corresponding to the top N scores as a retrieval result. A common method is to sort the scores to obtain the top N images. This method is inefficient when there are many images in the database, and the time complexity is also too high, which is O(n log n), even if a quick sort method is used. If 1 million images in a database are retrieved, the sorting takes more than 35 seconds.

However, in this embodiment, a quick sort algorithm may be used to find the Nth largest similarity score, and at the same time, the top N biggest similarity scores that are not sorted may be obtained. Normally, N<10, so that these N similarity scores are sorted using an insertion sort method to obtain a retrieval result. The quick sort algorithm has a complexity of O(n), and the time consumed for the insertion sort may be neglected, so that it is possible to significantly improve the retrieval efficiency.

In this embodiment, by the offline training and the online retrieval, the high-dimensional image features of the images in the database and the image to be retrieved are respectively divided into a plurality of low-dimensional image features; then each of the low-dimensional image features of the image to be retrieved is compared with the clustering centers at each layer of the low-dimensional image features of the images in a database; and a similarity of the low-dimensional image feature between the image to be retrieved and each of some images in the database is determined, so that features matching the high-dimensional image feature of the image to be retrieved are retrieved in the database, and the efficiency of high-dimensional image feature matching can be improved. Further, N images with the highest score are obtained by using a quick select algorithm combined with an insertion sort algorithm, and the high-dimensional image features of N images with the highest score are made as features matching the high-dimensional image feature of the image to be retrieved, therefor, the efficiency of high-dimensional image feature matching is further improved.

Figure 5:
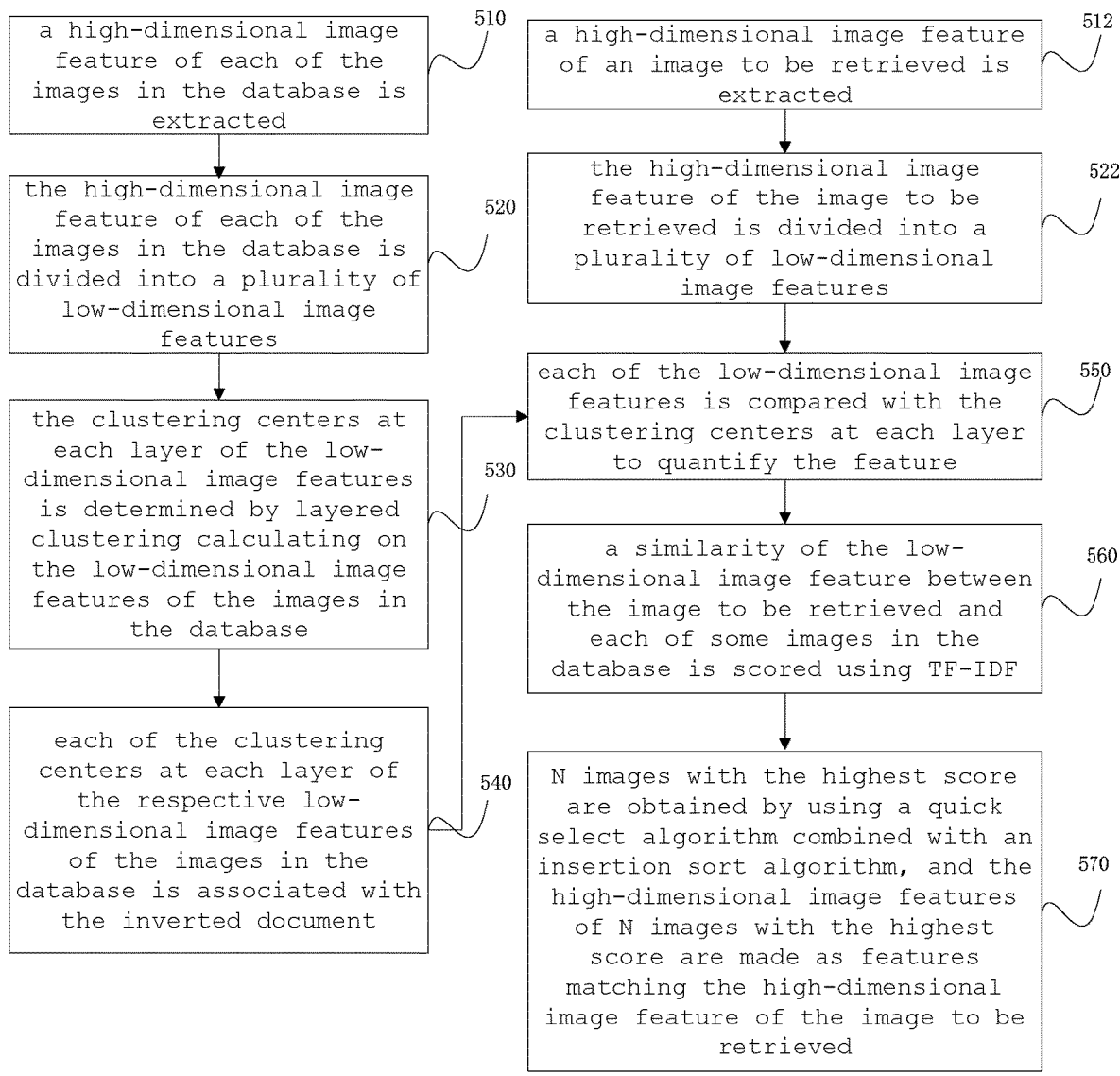
FIG. 5 is a schematic flow chart of other embodiments of a high-dimensional image feature matching method according to the present disclosure.

FIG. 5 is a schematic flow chart of other embodiments of a high-dimensional image feature matching method according to the present disclosure. The computer configuration used in the experiment is Intel Xeon E5-2630, with a clock speed of 2.30 GHz and a memory of 64G. The method comprises the following steps 510-570.

In step 510, a high-dimensional image feature of each of the images in the database is extracted. For example, 200,000 high-dimensional image features are extracted for 200,000 images of women wear using a deep neural network.

In step 512, a high-dimensional image feature of an image to be retrieved is extracted.

In step 520, the high-dimensional image feature of each of the images in the database is divided into a plurality of low-dimensional image features. For example, each output layer of the deep neural network may obtain a feature reaching 4096 dimensions, which is linearly combined into an 8192-dimensional feature, and this 8192-dimensional feature is divided into 128 64-dimensional sub-features.

In step 522, the high-dimensional image feature of the image to be retrieved is divided into a plurality of low-dimensional image features. That is, each 8192-dimensional feature of the image to be retrieved is also divided into 128 64-dimensional sub-features.

In step 530, the clustering centers at each layer of the low-dimensional image features is determined by layered clustering calculating on the low-dimensional image features of the images in the database.

In some embodiments, the initial clustering center of the kmeans clustering algorithm may be selected using the kmeans++ method. The kmeans++ algorithm selects an initial center according to probability ratios of points to the nearest center, and the steps are as follows:

(1) One initial center c1=x is randomly selected from the data points X.
(2) D(x) is set as the shortest Euclidean distance from one data point x to the nearest center.
(3) The next center ci is selected, wherein ci=x'∈X, with a probability value of D(x')2/ΣD(x)2.
(4) The steps (2) and (3) are repeated until all k centers are selected.

In some embodiments, a point of a fixed grid distance may also be selected as an initial clustering center, or an initial clustering center may be selected using a random initialization method, a genetic algorithm initialization method, or the like.

The kmeans clustering algorithm is an unsupervised clustering algorithm. The steps of the algorithm are as follows:
(1) k vectors are randomly selected from n data vectors as the initial clustering centers.
(2) For other vectors, they are assigned to the clusters closest to themselves according to their Euclidean distances to these clustering centers.
(3) The new clustering center is calculated according to the clustering mean, the cluster mean $$m_i = \frac{1}{n_i}\sum_{x=1}^{n} p_x, n_i$$

is the number of vectors belonging to the cluster i, $p_x$ is the vector belonging to the cluster i.
(4) This process repeats until the objective function value satisfies the termination condition, and finally the data is divided into k categories. The error squared and criterion function may be used as the objective function:

$$E = \underset{S}{\operatorname{argmin}} \sum_{i=1}^{k} \sum_{x_j \in s_i} \|x_j - \mu_i\|^2 \quad (10)$$

wherein $x_j$ is the data vector, $S_i$ is the cluster in which $x_j$ is situated, and $u_i$ is an average of the middle points of the cluster $S_i$.

In step 540, each of the clustering centers at each layer of the respective low-dimensional image features of the images in the database is associated with the inverted document, so that it is possible to quickly find the clustering center of the low-dimensional image features during online retrieval.

In step 550, each of the low-dimensional image features is compared with the clustering centers at each layer to quantify the feature.

In step 560, a similarity of the low-dimensional image feature between the image to be retrieved and each of some images in the database is scored using TF-IDF.

In step 570, N images with the highest score are obtained by using a quick select algorithm combined with an insertion sort algorithm, and the high-dimensional image features of N images with the highest score are made as features matching the high-dimensional image feature of the image to be retrieved.

In this embodiment, if the first result returned by the retrieval is a correct match, the result is recorded to be accurate, and the experiment result indicates that the retrieval accuracy rate reaches as high as 99.9470%. The retrieval time is less than 0.015 seconds, wherein the feature quantization time of the step 550 is about 0.001 seconds, the scoring time of the step 560 is about 0.010 seconds, and the time for obtaining the top eight scored images in the step 570 is about 0.003 seconds.

In other embodiments, one million 8192-dimensional image features are extracted for one million images of women wear using a deep neural network. The 8192-dimensional feature is divided into 128 64-dimensional sub-features, and layered clustering is performed using the method in the above-described embodiments. In the retrieval link, retrieval is performed using all the one million high-dimensional image features, and each 8192-dimensional feature is divided into 128 64-dimensional sub-features. The retrieval accuracy rate is as high as 96.2927%. The retrieval time is less than 0.025 seconds, wherein the feature quantization time of the step 550 is about 0.002 seconds, the scoring time of the step 560 is about 0.008 seconds, and the time for obtaining the top eight scored images in the step 570 is about 0.012 seconds.

By means of the above-described embodiments, each high-dimensional image feature is divided into a plurality of low-dimensional image features, so that they can be retrieved by the layered kmeans method. Since the initial clustering center is selected by using the kmeans++ algorithm, compared with random selection of the initial clustering center, the clustering effect and clustering efficiency are improved. In addition, the images corresponding to the top N scores are obtained using a quick sort algorithm combined with an insertion sort algorithm, therefor, the algorithm speed is improved.

Figure 6:
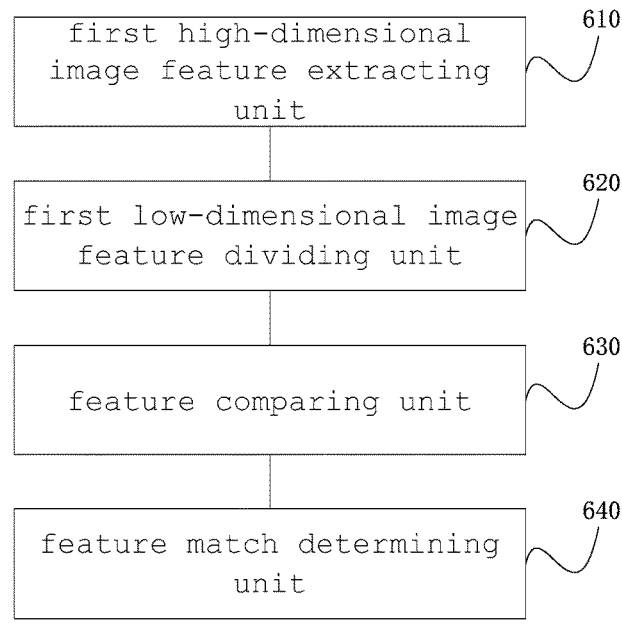
FIG. 6 is a schematic structural view of some embodiments of a high-dimensional image feature matching device according to the present disclosure.

FIG. 6 is a schematic structural view of some embodiments of a high-dimensional image feature matching device according to the present disclosure. The device comprises a first high-dimensional image feature extracting unit 610, a first low-dimensional image feature dividing unit 620, a feature comparing unit 630, and a feature match determining unit 640.

The first high-dimensional image feature extracting unit 610 is configured to extract a high-dimensional image feature of an image to be retrieved. The high-dimensional image feature of the image to be retrieved may be extracted by using deep neutral network.

The first low-dimensional image feature dividing unit 620 is configured to divide the high-dimensional image feature of the image to be retrieved into a plurality of low-dimensional image features.

The feature comparing unit 630 is configured to compare each of the low-dimensional image features of the image to be retrieved with clustering centers at each layer of the low-dimensional image features of the images in a database, to determine a nearest clustering center at each layer corresponding to each of the low-dimensional image features of the image to be retrieved, wherein the determined nearest clustering center is nearest to the corresponding low-dimensional image feature. It is possible to extract the high-dimensional image feature of each of the images in the database in advance, divide the high-dimensional image feature of each of the images in the database into a plurality of low-dimensional image features, then perform layered clustering calculation of the low-dimensional image features of the images in the database to determine the clustering centers at each layer of the low-dimensional image features, and then compare each of the low-dimensional image features of the image to be retrieved with the clustering centers at each layer.

The feature match determining unit 640 is configured to determine a similarity of the low-dimensional image feature between the image to be retrieved and each of some images in the database according to a comparison result, so that features matching the high-dimensional image feature of the image to be retrieved are retrieved in the database. For example, a similarity of the image feature is first scored, and the high-dimensional image features of the N images with the highest score are made as features matching the high-dimensional image feature of the image to be retrieved.

In this embodiment, the high-dimensional image feature of the image to be retrieved is divided into a plurality of low-dimensional image features; then each of the low-dimensional image features is compared with the clustering centers at each layer of the low-dimensional image features of the images in a database; and a similarity of the low-dimensional image feature between the image to be retrieved and each of some images in the database is determined, so that features matching the high-dimensional image feature of the image to be retrieved are retrieved in the database, and the efficiency of high-dimensional image feature matching can be improved, and the efficiency of high-dimensional image feature matching is improved.

Figure 7:
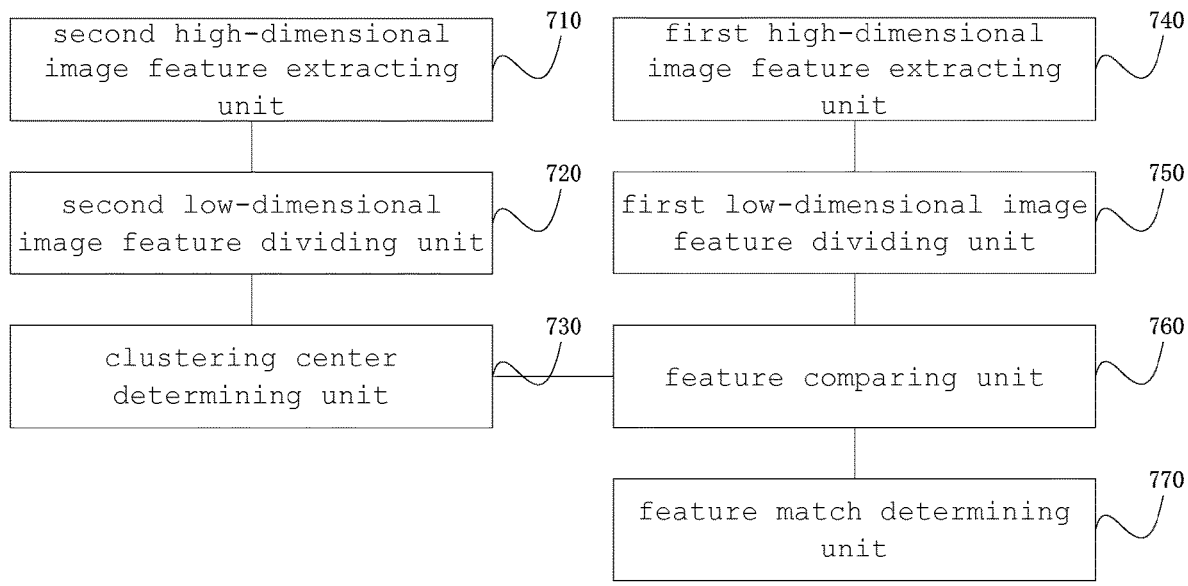
FIG. 7 is a schematic structural view of other embodiments of a high-dimensional image feature matching device according to the present disclosure.

FIG. 7 is a schematic structural view of other embodiments of a high-dimensional image feature matching device according to the present disclosure. The device comprises a first high-dimensional image feature extracting unit 740, a first low-dimensional image feature dividing unit 750, a feature comparing unit 760, and a feature match determining unit 770. The clustering centers at each layer of the low-dimensional image features of the image in the database are determined by a second high-dimensional image feature extracting unit 710, a second low-dimensional image feature dividing unit 720, and a clustering center determining unit 730.

The second high-dimensional image feature extracting unit 710 is configured to extract a high-dimensional image feature of each of the images in the database.

The second low-dimensional image feature dividing unit 720 is configured to divide the high-dimensional image feature of each of the images in the database into a plurality of low-dimensional image features. The high-dimensional image features of the images in the database and the image to be retrieved may have the same dividing manner.

The clustering center determining unit 730 is configured to determine the clustering centers at each layer of the low-dimensional image features by performing layered clustering calculation of the low-dimensional image features of the images in the database. Unsupervised training on a set consisting of low-dimensional image features of the images in the database may be performed, wherein a bifurcating factor of a clustering is defined to be k which is a natural number. One data point of the low-dimensional image features in an initial training set is randomly selected as an initial clustering center of a kmeans clustering algorithm; k initial clustering centers are determined according to probability ratios of points to nearest centers. Then, a set consisting of the low-dimensional image features of the images in the database is divided into k sets using the kmeans clustering algorithm, and the k sets are used as sets of a first layer of a kmeans tree. Then, iterative division of each set of a current layer in the kmeans tree is sequentially performed using the kmeans clustering algorithm until a leaf layer of the kmeans tree is reached, and a clustering center of each set of each layer the low-dimensional image features of the images in the database is calculated according to a clustering mean.

The first high-dimensional image feature extracting unit 740 is configured to extract a high-dimensional image feature of an image to be retrieved.

The first low-dimensional image feature dividing unit 750 is configured to divide the high-dimensional image feature of the image to be retrieved into a plurality of low-dimensional image features.

The feature comparing unit 760 is configured to compare each of the low-dimensional image features with the clustering centers at each layer to quantify the feature. Each of the low-dimensional image features of the image to be retrieved is compared with each of k clustering centers of each layer, starting from the first layer of the kmeans tree of the low-dimensional image features of the images in the database, to determine a nearest clustering center corresponding to each of the low-dimensional image features of the image to be retrieved, wherein the nearest clustering center is nearest to the corresponding low-dimensional image feature, and each of the low-dimensional image features of the image to be retrieved is compared with each sub-clustering center of each nearest clustering center by recursion, until a leaf layer of the kmeans tree is reached. This process quantifies each of the low-dimensional image features.

If the kmeans tree contains L layers, for one low-dimensional image feature, the calculation cost required for quantization in total consists in kL times of distance calculation, and when k is not large, the quantization process is very fast.

The feature match determining unit 770 is configured to score a similarity of the low-dimensional image feature between the image to be retrieved and each of some images in the database using a term frequency-inverse document frequency algorithm.

The feature match determining unit 770 is further configured to obtain N images with the highest score using a quick select algorithm combined with an insertion sort method, and making the high-dimensional image features of N images with the highest score as features matching the high-dimensional image feature of the image to be retrieved.

After the scoring of a similarity between the image to be retrieved and each of some images in the database is obtained by calculation, it is necessary to obtain the images corresponding to the top N scores as a retrieval result. A common method is to sort the scores to obtain the top N images. This method is inefficient when there are many images in the database, and the time complexity is also too high, which is O(n log n), even if a quick sort method is used. If 1 million images in a database are retrieved, the sorting takes more than 35 seconds.

However, in this embodiment, a quick sort algorithm may be used to find the Nth biggest similarity score, and at the same time, the top N largest similarity scores that are not sorted may be obtained. Normally, N<10, so that these N similarity scores are sorted using an insertion sort method to obtain a retrieval result. The quick sort algorithm has a complexity of O(n), and the time consumed for the insertion sort may be neglected, so that it is possible to significantly improve the retrieval efficiency.

In order to enable quickly finding the clustering centers of the low-dimensional image features during online retrieval, it is also possible to associate each of the clustering centers at each layer of respective low-dimensional image features of the images in the database with the inverted document.

In this embodiment, by the offline training and the online retrieval, the high-dimensional image features of the images in the database and the image to be retrieved are respectively divided into a plurality of low-dimensional image features; then each of the low-dimensional image features of the image to be retrieved is compared with clustering centers at each layer of the low-dimensional image features of the images in a database; and a similarity of the low-dimensional image feature between the image to be retrieved and each of some images in the database is determined, so that features matching the high-dimensional image feature of the image to be retrieved are retrieved in the database, and the efficiency of high-dimensional image feature matching can be improved. Further, N images with the highest score are obtained by using a quick select algorithm combined with an insertion sort algorithm, and the high-dimensional image features of N images with the highest score are made as features matching the high-dimensional image feature of the image to be retrieved, therefor, the efficiency of high-dimensional image feature matching is further improved.

Figure 8:
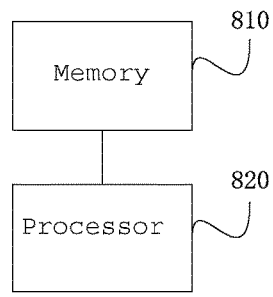
FIG. 8 is a schematic structural view of further embodiments of a high-dimensional image feature matching device according to the present disclosure.

FIG. 8 is a schematic structural view of further embodiments of a high-dimensional image feature matching device according to the present disclosure. The device comprises a memory 810 and a processor 820.

The memory 810 may be a magnetic disk, a flash memory, or any other non-volatile storage medium. The memory is configured to store instructions in embodiments corresponding to FIGS. 1, 2, 4, 5.

The processor 820 which is coupled to the memory 810, may be implemented as one or more integrated circuits, such as a microprocessor or a microcontroller. The processor 820 which is configured to execute instructions stored in the memory, can improve the accuracy of feature matching, and also improve the efficiency of high-dimensional image feature matching.

Figure 9:
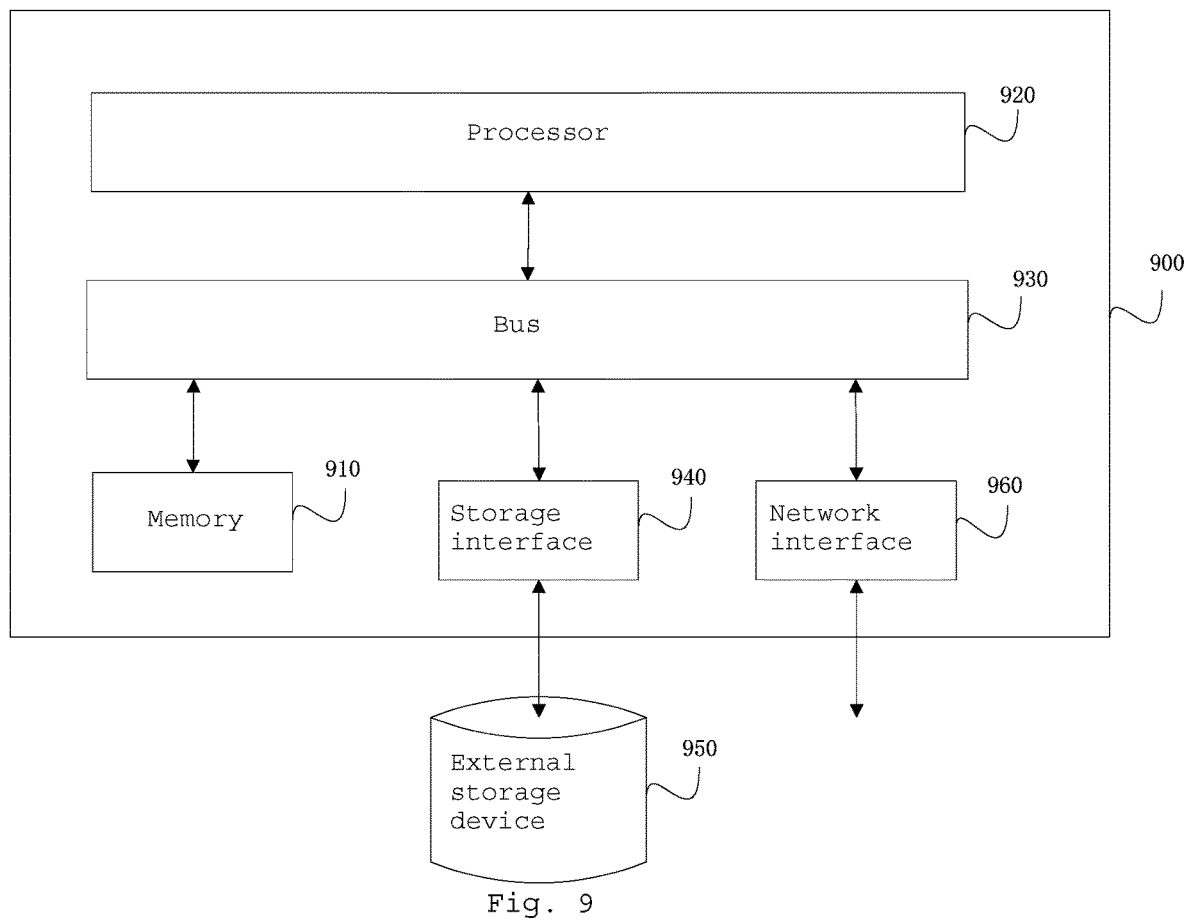
FIG. 9 is a schematic structural view of still further embodiments of a high-dimensional image feature matching device according to the present disclosure.

In some embodiments, it may also be that, as shown in FIG. 9, the high-dimensional image feature matching device 900 comprises a memory 910 and a processor 920. The processor 920 is coupled to the memory 910 via a bus 930.

The high-dimensional image feature matching device 900 may also be connected to the external storage device 950 via a storage interface 940 for calling external data, and may also be connected to the network or another computer system (not shown) via the network interface 960. It will not be introduced in detail here.

In this embodiment, data instructions are stored by the memory, and then the above-described instructions are processed by the processor, so that it can improve the accuracy of feature matching, and also improve the efficiency of high-dimensional image feature matching.

In other embodiments, a computer readable storage medium has stored thereon computer program instructions which, when executed by a processor, implement the steps of the method in the embodiments corresponding to FIGS. 1, 2, 4 and 5. Those skilled in the art will appreciate that the embodiments of the present disclosure may be provided as a method, device, or computer program product.

Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (comprising but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a particular manner, such that the instructions stored in the computer readable memory produce a manufacture comprising an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

Heretofore, the present disclosure has been described in detail. Some details well known in the art are not described to avoid obscuring the concept of the present disclosure. According to the above description, those skilled in the art would fully know how to implement the technical solutions disclosed herein.

The method and device of the present disclosure may be implemented in many manners. For example, the method and device of the present disclosure may be implemented by a software, hardware, firmware, or any combination of a software, hardware, and firmware.

The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which comprise machine readable instructions for implementing the method according to the present disclosure. Thus, the present disclosure also covers a recording medium that stores programs for performing the method according to the present disclosure.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments may be made without departing from the scope and spirit of the present disclosure. The scope of the disclosure is defined by the following claims.

What is claimed is:

1. A high-dimensional image feature matching method, comprising:
   extracting a high-dimensional image feature of an image to be retrieved;
   dividing the high-dimensional image feature of the image to be retrieved into a plurality of low-dimensional image features;
   determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and
   determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database,
   wherein the clustering centers at each laver of the low-dimensional image features of the images in the database are determined by:
      extracting a high-dimensional image feature of each of the images in the database,
      dividing the high-dimensional image feature of each of the images in the database into a plurality of low-dimensional image features, and
      determining the clustering centers at each laver of the low-dimensional image features by performing a layered clustering calculation on the low-dimensional image features of the images in the database, comprising:
         performing unsupervised training on a set consisting of low-dimensional image features of the images in the database, wherein a bifurcating factor of a clustering is defined to be k, randomly selecting one low-dimensional image feature data point in an initial training set as an initial clustering center of a kmeans clustering algorithm, determining k initial clustering centers according to probability ratios of low-dimensional image feature data points to nearest centers, dividing a set consisting of the low-dimensional image features of the images in the database into k sets using the kmeans clustering algorithm, and making the k sets as sets of a first layer of a kmeans tree, sequentially performing iterative division of each set of a current layer in the kmeans tree using the kmeans clustering algorithm until a leaf layer of the kmeans tree is reached, and calculating a clustering center of each set of each layer of the low-dimensional image features of the images in the database according to a clustering mean.

2. The high-dimensional image feature matching method according to claim 1, wherein each of the clustering centers at each layer of the low-dimensional image features of the images in the database is associated with an inverted file.

3. The high-dimensional image feature matching method according to claim 1, wherein comparing each of the low-dimensional image features of the image to be retrieved with clustering centers at each layer of the low-dimensional image features of the images in a database comprises:

comparing each of the low-dimensional image features of the image to be retrieved with each of k clustering centers of a first layer of the kmeans tree of the low-dimensional image features of the images in the database, to determine a nearest clustering center corresponding to each of the low-dimensional image features of the image to be retrieved at the first layer, wherein the nearest clustering center is nearest to the corresponding low-dimensional image feature; and comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of a previous layer.

4. The high-dimensional image feature matching method according to claim 1, wherein determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database comprises:

determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center;

determining a similarity score of the low-dimensional image feature between the image to be retrieved and each of the images associated with the determined nearest clustering center in the database, according to a distance between the feature vector of each of the images associated with the determined nearest clustering center in the database and the feature vector of the image to be retrieved; and obtaining N images with the highest score in the database using a quick select algorithm combined with an insertion sort algorithm, and making the high-dimensional image features of the N images with the highest score as features matching the high-dimensional image feature of the image to be retrieved.

5. A high-dimensional image feature matching device, comprising:

a memory; and a processor coupled to the memory, wherein the processor is configured to perform a high-dimensional image feature method on a basis of instructions stored in the memory, comprising:

extracting a high-dimensional image feature of an image to be retrieved;

dividing the high-dimensional image feature of the image to be retrieved into a plurality of low-dimensional image features;

determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database, wherein the clustering centers at each layer of the low-dimensional image features of the images in the database are determined by:

extracting a high-dimensional image feature of each of the images in the database, dividing the high-dimensional image feature of each of the images in the database into a plurality of low-dimensional image features, and determining the clustering centers at each layer of the low-dimensional image features by performing a layered clustering calculation on the low-dimensional image features of the images in the database, comprising:

performing unsupervised training on a set consisting of low-dimensional image features of the images in the database, wherein a bifurcating factor of a clustering is defined to be k, randomly selecting one low-dimensional image feature data point in an initial training set as an initial clustering center of a kmeans clustering algorithm, determining k initial clustering centers according to probability ratios of low-dimensional image feature data points to nearest centers, dividing a set consisting of the low-dimensional image features of the images in the database into k sets using the kmeans clustering algorithm, and making the k sets as sets of a first layer of a kmeans tree, sequentially performing iterative division of each set of a current layer in the kmeans tree using the kmeans clustering algorithm until a leaf layer of the kmeans tree is reached, and calculating a clustering center of each set of each layer of the low-dimensional image features of the images in the database according to a clustering mean.

6. The high-dimensional image feature matching device according to claim 5, wherein each of the clustering centers at each layer of the low-dimensional image features of the images in the database is associated with an inverted file.

7. The high-dimensional image feature matching device according to claim 5, wherein comparing each of the low-dimensional image features of the image to be retrieved with clustering centers at each layer of the low-dimensional image features of the images in a database comprises:
   comparing each of the low-dimensional image features of the image to be retrieved with each of k clustering centers of a first layer of the kmeans tree of the low-dimensional image features of the images in the database, to determine a nearest clustering center corresponding to each of the low-dimensional image features of the image to be retrieved at the first layer, wherein the nearest clustering center is nearest to the corresponding low-dimensional image feature; and
   comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of a previous layer.

8. The high-dimensional image feature matching device according to claim 5, wherein determining a similarity of the low-dimensional image feature between the image to be retrieved and each of the images in the database according to the determined nearest clustering center, so that at least one high-dimensional image feature matching the high-dimensional image feature of the image to be retrieved is retrieved in the database comprises:
   determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center;
   determining a similarity score of the low-dimensional image feature between the image to be retrieved and each of the images associated with the determined nearest clustering center in the database, according to a distance between the feature vector of each of the images associated with the determined nearest clustering center in the database and the feature vector of the image to be retrieved; and
   obtaining N images with the highest score in the database using a quick select algorithm combined with an insertion sort algorithm, and making the high-dimensional image features of the N images with the highest score as features matching the high-dimensional image feature of the image to be retrieved.

9. A non-transitory computer readable storage medium on which computer program instructions are stored, which when executed by a processor implement a high-dimensional image feature method, comprising:
   extracting a high-dimensional image feature of an image to be retrieved;
   dividing the high-dimensional image feature of the image to be retrieved into a plurality of low-dimensional image features;
   determining a nearest clustering center at each layer of low-dimensional image features of images in a database corresponding to each of the low-dimensional image features of the image to be retrieved, by comparing each of the low-dimensional image features of the image to be retrieved with clustering centers at each layer, wherein the determined nearest clustering center is nearest to the corresponding low-dimensional image feature; and
   determining a similarity of the low-dimensional image feature between the image to be retrieved and each of some images in the database according to the determined nearest clustering center, so that at least one high-dimensional image feature matching the high-dimensional image feature of the image to be retrieved is retrieved in the database
   wherein the clustering centers at each layer of the low-dimensional image features of the images in the database are determined by:
      extracting a high-dimensional image feature of each of the images in the database,
      dividing the high-dimensional image feature of each of the images in the database into a plurality of low-dimensional image features, and
      determining the clustering centers at each laver of the low-dimensional image features by performing a layered clustering calculation on the low-dimensional image features of the images in the database, comprising:
         performing unsupervised training on a set consisting of low-dimensional image features of the images in the database, wherein a bifurcating factor of a clustering is defined to be k,
         randomly selecting one low-dimensional image feature data point in an initial training set as an initial clustering center of a kmeans clustering algorithm,
         determining k initial clustering centers according to probability ratios of low-dimensional image feature data points to nearest centers,
         dividing a set consisting of the low-dimensional image features of the images in the database into k sets using the kmeans clustering algorithm, making the k sets as sets of a first laver of a kmeans tree,
         sequentially performing iterative division of each set of a current layer in the kmeans tree using the kmeans clustering algorithm until a leaf laver of the kmeans tree is reached, and
         calculating a clustering center of each set of each laver of the low-dimensional image features of the images in the database according to a clustering mean.

10. The non-transitory computer-readable storage medium according to claim 9, wherein each of the clustering centers at each layer of the low-dimensional image features of the images in the database is associated with an inverted file.

11. The non-transitory computer-readable storage medium according to claim 9, wherein comparing each of the low-dimensional image features of the image to be retrieved with clustering centers at each layer of the low-dimensional image features of the images in a database comprises:

comparing each of the low-dimensional image features of the image to be retrieved with each of k clustering centers of a first layer of the kmeans tree of the low-dimensional image features of the images in the database, to determine a nearest clustering center corresponding to each of the low-dimensional image features of the image to be retrieved at the first layer, wherein the nearest clustering center is nearest to the corresponding low-dimensional image feature; and comparing each of the low-dimensional image features of the image to be retrieved with each of k clustering centers of the current layer by recursion, starting from a second layer of the kmeans tree, and ending at a leaf layer of the kmeans tree, wherein the k clustering centers of the current layer are sub-clustering centers of the nearest clustering center of a previous layer.

12. The non-transitory computer-readable storage medium according to 9, wherein determining a similarity of the low-dimensional image feature between the image to be retrieved and each of the images in the database according to the determined nearest clustering center, so that at least one high-dimensional image feature matching the high-dimensional image feature of the image to be retrieved is retrieved in the database comprises:

determining a feature vector of each of the images associated with the determined nearest clustering center in the database and a feature vector of the image to be retrieved, by calculating the low-dimensional image features of the images in the database and the low-dimensional image features of the image to be retrieved, using a term frequency-inverse document frequency algorithm, and according to the determined nearest clustering center;

determining a similarity score of the low-dimensional image feature between the image to be retrieved and each of the images associated with the determined nearest clustering center in the database, according to a distance between the feature vector of each of the images associated with the determined nearest clustering center in the database and the feature vector of the image to be retrieved; and obtaining N images with the highest score in the database using a quick select algorithm combined with an insertion sort algorithm, and making the high-dimensional image features of the N images with the highest score as features matching the high-dimensional image feature of the image to be retrieved.

\* \* \* \* \*